United States Patent
Hirata

(10) Patent No.: US 11,112,782 B2
(45) Date of Patent: Sep. 7, 2021

(54) PROCESS ANOMALOUS STATE DIAGNOSTIC DEVICE AND PROCESS ANOMALOUS STATE DIAGNOSIS METHOD

(71) Applicant: JFE STEEL CORPORATION, Tokyo (JP)

(72) Inventor: Takehide Hirata, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 19 days.

(21) Appl. No.: 16/624,677

(22) PCT Filed: Jun. 19, 2018

(86) PCT No.: PCT/JP2018/023253
§ 371 (c)(1),
(2) Date: Dec. 19, 2019

(87) PCT Pub. No.: WO2018/235807
PCT Pub. Date: Dec. 27, 2018

(65) Prior Publication Data
US 2020/0110394 A1 Apr. 9, 2020

(30) Foreign Application Priority Data
Jun. 19, 2017 (JP) .............................. JP2017-119475

(51) Int. Cl.
*G05B 23/02* (2006.01)
*B21B 38/00* (2006.01)

(52) U.S. Cl.
CPC .......... *G05B 23/0281* (2013.01); *B21B 38/00* (2013.01)

(58) Field of Classification Search
None
See application file for complete search history.

(56) References Cited

U.S. PATENT DOCUMENTS

2008/0276136 A1 11/2008 Lin et al.
2009/0030753 A1 1/2009 Senturk-Doganaksoy et al.
(Continued)

FOREIGN PATENT DOCUMENTS

JP H02-76098 A 3/1990
JP H07-60815 A 3/1995
(Continued)

OTHER PUBLICATIONS

Motoya, Toshihiro. "New phase in utilization of print data—New ideas and practice—Attempts to utilize monitoring and diagnosis system into facility maintenance". Instrumentation, vol. 59, No. 7, pp. 29-33, 2018.
(Continued)

*Primary Examiner* — Carlos R Ortiz Rodriguez
(74) *Attorney, Agent, or Firm* — Oliff PLC

(57) ABSTRACT

A process anomalous state diagnostic device configured to diagnose an anomalous state of a process based on deviation indexes for the magnitude of deviation from a reference that is a normal state of the process includes: a color mapping unit configured to configure a two-dimensional matrix that has a first axis as an axis of a temporal factor including time and that has a second axis as an axis of an item of each deviation index, associate each cell of the matrix with data for an item of the deviation index and the temporal factor, and allocate a color in accordance with the magnitude of the deviation index to each cell of the matrix; and a color map display unit configured to display a color map produced by the color mapping unit.

22 Claims, 11 Drawing Sheets

(56) References Cited

U.S. PATENT DOCUMENTS

| | | |
|---|---|---|
| 2010/0249976 A1 | 9/2010 | Aharoni et al. |
| 2014/0136146 A1 | 5/2014 | McCready |
| 2015/0052485 A1 | 2/2015 | Grounds et al. |

FOREIGN PATENT DOCUMENTS

| | | |
|---|---|---|
| JP | H10-153456 A | 6/1998 |
| JP | H11-170326 A | 6/1999 |
| JP | 2002-120213 A | 4/2002 |
| JP | 4922265 B2 | 4/2012 |
| JP | 2013-50788 A | 3/2013 |
| JP | 2013-82181 A | 5/2013 |
| JP | 2014-148294 A | 8/2014 |
| JP | 2015-197850 A | 11/2015 |
| JP | 2016-12240 A | 1/2016 |
| JP | 2016-81482 A | 5/2016 |
| WO | 2013/011745 A1 | 1/2013 |

OTHER PUBLICATIONS

Nov. 19, 2019 Notification of Reason for Refusal issued in Japanese Patent Application No. 2018-546556.
Aug. 14, 2018 International Search Report issued in International Patent Application No. PCT/JP2018/023253.
Jun. 20, 2020 Extended European Search Report issued in European Patent Application No. 18820645.2.

FIG.2

|  | MATERIAL BEFORE MANUFACTURING | FACILITY 1 | FACILITY 2 | ... | FACILITY n | PRODUCT AFTER MANUFACTURING |
|---|---|---|---|---|---|---|
| FACILITY SETTING |  | SUB MODEL / SUB MODEL / ... / SUB MODEL | SUB MODEL / SUB MODEL / ... / SUB MODEL | SUB MODEL / SUB MODEL / ... / SUB MODEL | SUB MODEL / SUB MODEL / ... / SUB MODEL |  |
| FACILITY RECORD | SUB MODEL / SUB MODEL / ... / SUB MODEL | SUB MODEL / SUB MODEL / ... / SUB MODEL | SUB MODEL / SUB MODEL / ... / SUB MODEL | SUB MODEL / SUB MODEL / ... / SUB MODEL | SUB MODEL / SUB MODEL / ... / SUB MODEL |  |
| MANUAL INTERVENTION RECORD |  | SUB MODEL / SUB MODEL / ... / SUB MODEL | SUB MODEL / SUB MODEL / ... / SUB MODEL | SUB MODEL / SUB MODEL / ... / SUB MODEL | SUB MODEL / SUB MODEL / ... / SUB MODEL |  |
| INTERMEDIATE PRODUCT STATE RECORD |  | SUB MODEL / SUB MODEL / ... / SUB MODEL | SUB MODEL / SUB MODEL / ... / SUB MODEL | SUB MODEL / SUB MODEL / ... / SUB MODEL | SUB MODEL / SUB MODEL / ... / SUB MODEL | SUB MODEL / SUB MODEL / ... / SUB MODEL |

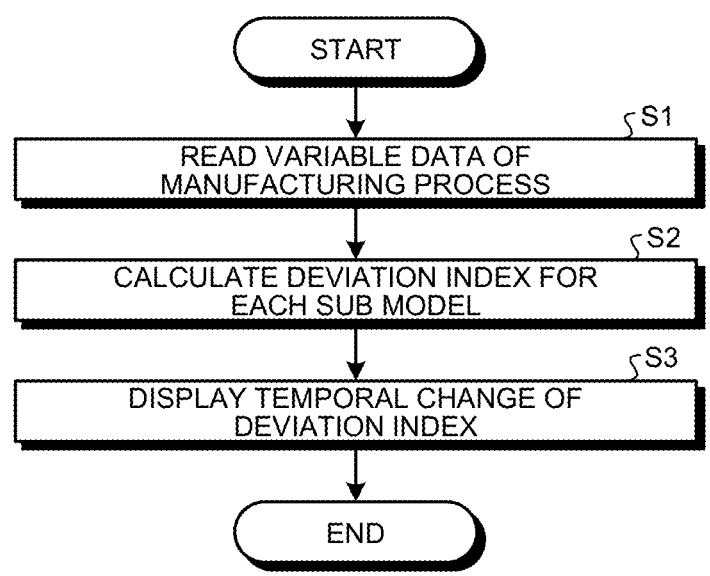

FIG.12
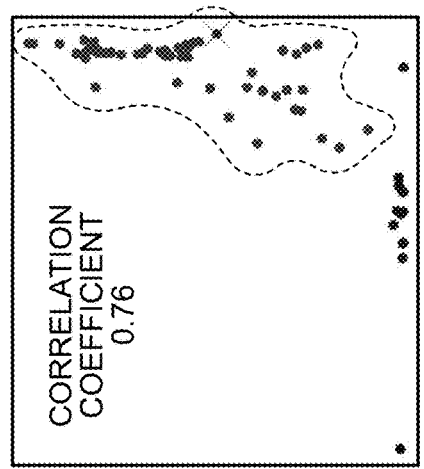
CORRELATION COEFFICIENT -0.93
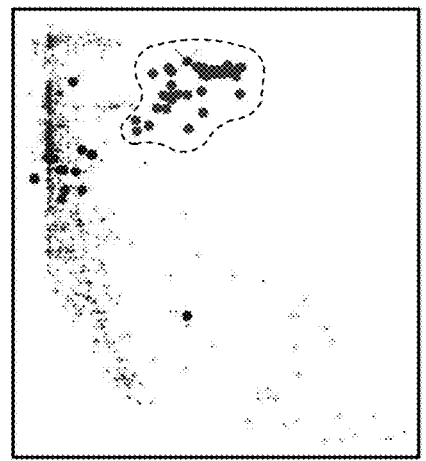
CORRELATION COEFFICIENT 0.80
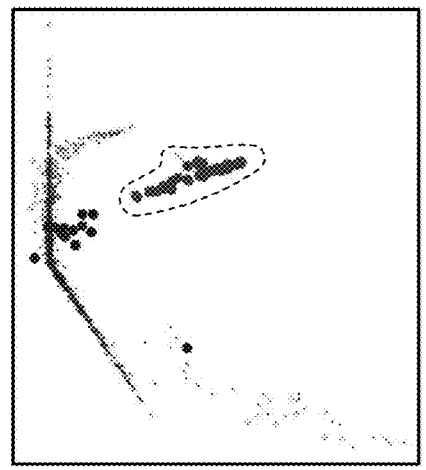
CORRELATION COEFFICIENT 0.76
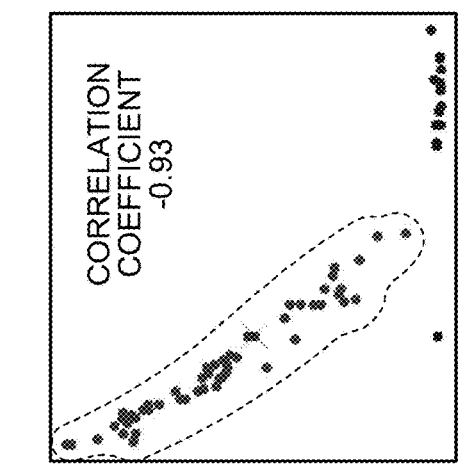
DEVIATION INDEX OF VARIABLE A / RECORD OF VARIABLE A | RECORD OF VARIABLE A | RECORD OF VARIABLE B | RECORD OF VARIABLE C

PROCESS ANOMALOUS STATE DIAGNOSTIC DEVICE AND PROCESS ANOMALOUS STATE DIAGNOSIS METHOD

FIELD

The present invention relates to an anomalous state diagnostic device and an anomalous state diagnosis method for a process such as a manufacturing process.

BACKGROUND

A method of diagnosing an anomalous state of a process such as a manufacturing process, a power generation process, or a conveyance process includes a model base approach and a database approach. The model base approach is an approach that establishes a model in which a physical or chemical phenomenon in the process is expressed in an expression, and that diagnoses the anomalous state of the process by using the established model. The database approach is an approach that establishes a statistically analytic model from operation data obtained through the process and diagnoses the anomalous state of the process by using the established model.

In a manufacturing process such as an iron steel process, products in a large number of kinds and a large number of sizes are manufactured through one production line, and thus the number of operation patterns is infinite. In a manufacturing process at a blast furnace or the like, a natural object such as iron ore or coke is used as a raw material, and thus large variance occurs to the manufacturing process. Accordingly, an approach only with the model base approach has limitations when the anomalous state of a manufacturing process such as an iron steel process is diagnosed.

The database approach includes a diagnosis method that produces a database of operation data at past generations of anomaly and determines similarity with current operation data, and a diagnosis method that produces a database of operation data at normal operation and determines difference from current operation data. However, in a manufacturing process such as an iron steel process, unprecedented trouble often occurs when the number of facilities used for manufacturing is large and when the number of aged facilities is large as in Japan, in particular. Accordingly, a diagnosis method such as the former method based on past trouble cases has limitations on the prediction of the anomalous state.

The latter diagnosis method includes those disclosed in Patent Literatures 1 and 2. Specifically, Patent Literatures 1 and 2 each discloses a method that predicts or senses the anomalous state of a manufacturing process based on prediction with a model produced by using operation data at normal operation.

CITATION LIST

Patent Literature

Patent Literature 1: WO 2013/011745
Patent Literature 2: Japanese Patent No. 4922265

SUMMARY

Technical Problem

However, when a statistical model as disclosed in Patent Literature 1 and 2 is used, comprehensive determination with a large number of statistical models needs to be performed for a manufacturing process in which a phenomenon is complex. However, variance in prediction accuracy occurs among the statistical models leads to large noise, and thus it is difficult to determine a true anomaly from a prediction result.

The present invention is intended to solve the above-described problem and provide a process anomalous state diagnostic device and a process anomalous state diagnosis method that allow easy understanding of whether an anomaly is a true anomaly when an anomalous state of a process such as a manufacturing process is diagnosed based on prediction with a model.

Solution to Problem

To solve the problem and achieve the object, a process anomalous state diagnostic device configured to diagnose an anomalous state of a process based on deviation indexes for the magnitude of deviation from a reference that is a normal state of the process according to the present invention includes: a color mapping unit configured to configure a two-dimensional matrix that has a first axis as an axis of a temporal factor including time and that has a second axis as an axis of an item of each deviation index, associate each cell of the matrix with data for an item of the deviation index and the temporal factor, and allocate a color in accordance with the magnitude of the deviation index to each cell of the matrix; and a color map display unit configured to display a color map produced by the color mapping unit.

Moreover, the process anomalous state diagnostic device according to the present invention further includes a deviation index calculation unit configured to select variables indicating the state of the process and calculate the deviation index based on the difference between a prediction value by a prediction model that predicts an actual value of each selected variable and the actual value.

Moreover, in the process anomalous state diagnostic device according to the present invention, the deviation index is a physical quantity including a vibration value or a temperature value of a facility included in the process and indicating soundness of the facility.

Moreover, in the process anomalous state diagnostic device according to the present invention, the color mapping unit is configured to configure a matrix having a hierarchical structure including plurality of layers by collecting each cell of the matrix for each predetermined interval on the first axis, associate a collective value of collected deviation indexes to each cell on each layer of the matrix, and allocate a color in accordance with the magnitude of the collective value of the deviation indexes to each cell on each layer of the matrix, and the color map display unit is configured to display, when a first pointer operation is performed on a cell of a color map corresponding to the matrix at a certain layer, a color map corresponding to the matrix one layer lower than the certain layer.

Moreover, in the process anomalous state diagnostic device according to the present invention, the color mapping unit is configured to collect each cell of the matrix for each batch processing in the process.

Moreover, in the process anomalous state diagnostic device according to the present invention, the color mapping unit is configured to configure a matrix having a hierarchical structure including plurality of layers by collecting each cell of the matrix for each item of the deviation index on the second axis, associate a collective value of collected deviation indexes to each cell on each layer of the matrix, and allocate a color in accordance with the magnitude of the collective value of the deviation indexes to each cell on each layer of the matrix, and the color map display unit is configured to display, when a second pointer operation is performed on a cell of a color map corresponding to the matrix at a certain layer, a color map corresponding to the matrix one layer lower than the certain layer.

Moreover, in the process anomalous state diagnostic device according to the present invention, the color mapping unit is configured to collect each cell of the matrix for each property of the deviation index.

Moreover, in the process anomalous state diagnostic device according to the present invention, the property of the deviation index is a sub process included in the process or a physical quantity indicating the state of the process.

Moreover, the process anomalous state diagnostic device according to the present invention further includes an information display unit configured to associate each cell of the matrix with a corresponding condition of the process and to display the value of the deviation index and the condition of the process corresponding to the cell in a separate window when a third pointer operation is performed on the cell.

Moreover, the process anomalous state diagnostic device according to the present invention further includes a relevant graph display unit configured to associate each cell of the matrix with a temporal sequence chart of the corresponding deviation index or a scatter diagram of variables specified for each corresponding deviation index and to display the temporal sequence chart or the scatter diagram corresponding to the cell in a separate window when a fourth pointer operation is performed on the cell.

Moreover, an anomalous state diagnosis method for a process of diagnosing an anomalous state of a process based on deviation indexes for the magnitude of deviation from a reference that is a normal state of the process according to the present invention includes: a color mapping step of configuring a two-dimensional matrix that has a first axis as an axis of a temporal factor including time and that has a second axis as an axis of an item of each deviation index, associating each cell of the matrix with data for an item of the deviation index and the temporal factor, and allocating a color in accordance with the magnitude of the deviation index to each cell of the matrix; and a color map display step of displaying a color map produced at the color mapping step.

Advantageous Effects of Invention

According to the present invention, a sign of generation of anomaly can be indicated to an operator in an easily visually recognizable manner by displaying the state of a process in a color map, and strong impression can be provided to warn the operator when there is a sign of generation of an anomaly.

BRIEF DESCRIPTION OF DRAWINGS

FIG. 2 is a conceptual diagram illustrating the configuration of sub models stored in a sub model table of the process anomalous state diagnostic device according to the first embodiment of the present invention, and a property of each sub model.

FIG. 3 is a flowchart illustrating the entire process of an anomalous state diagnosis method performed by the process anomalous state diagnostic device according to the first embodiment of the present invention.

FIG. 12 is a diagram illustrating an example in which a scatter diagram corresponding to a cell is displayed in a separate window by a relevant graph display unit of the process anomalous state diagnostic device according to the second embodiment of the present invention.

DESCRIPTION OF EMBODIMENTS

First Embodiment

A process anomalous state diagnostic device and an anomalous state diagnosis method according to a first embodiment of the present invention will be described below with reference to the accompanying drawings. The present invention is not limited to embodiments described below. Components in the embodiments described below include those easily replaceable by the skilled person in the art or those identical in effect. In the following description, "A and/or B" specifically means "A and B" or "A or B".

[Anomalous State Diagnostic Device]

Figure 1:
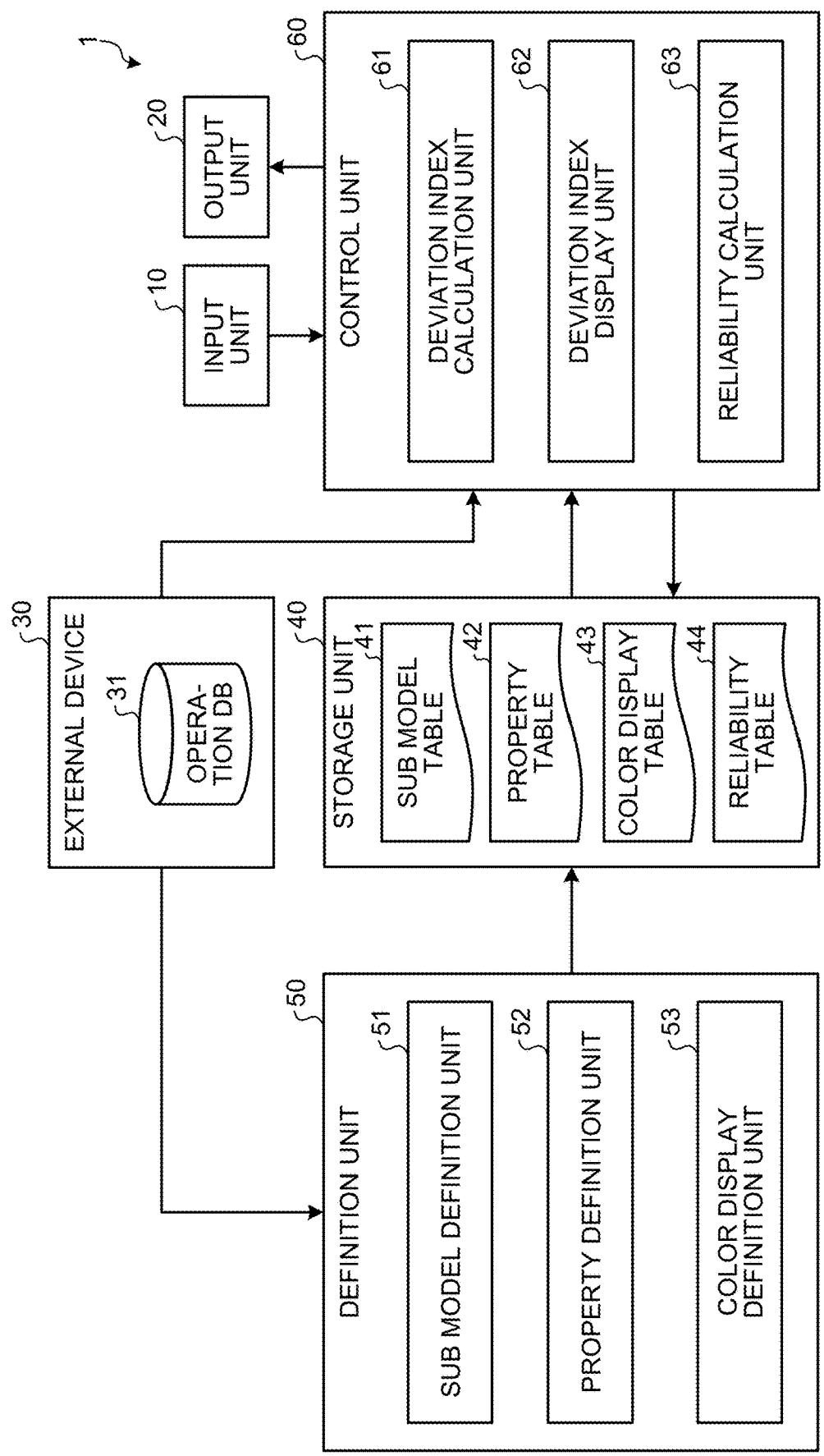
FIG. 1 is a block diagram illustrating the configuration of a process anomalous state diagnostic device according to a first embodiment of the present invention.

An anomalous state diagnostic device 1 is a device configured to diagnose anomalous states of various kinds of processes such as a manufacturing process at a manufacturing facility such as an iron steel facility, a power generation process at a power generation facility, and a conveyance process at a conveyance facility, and as illustrated in FIG. 1, includes an input unit 10, an output unit 20, an external device 30, a storage unit 40, a definition unit 50, and a control unit 60 as main components. In the following description, an example in which the anomalous state diagnostic device 1 is applied to a manufacturing process such as an iron steel process will be described.

The input unit 10 is a device configured to receive, through an information and control system network, actual operation data of a diagnosis target for which sub model prediction to be described later and factor estimation are performed. The input unit 10 inputs, to the control unit 60, the actual operation data of the diagnosis target, which is received from, for example, a process computer (not illustrated). The anomalous state diagnostic device 1 may include, as the input unit 10, for example, a mouse, a keyboard, or the like.

The output unit 20 is achieved by an output device such as a display device or a printing device, and outputs various kinds of processing information of the control unit 60.

The external device 30 is connected with the definition unit 50 and the control unit 60 in a state in which information communication is possible through an electrical communication line. The external device 30 includes an operation database (hereinafter referred to as "operation DB") 31. In the operation DB 31, among actual values of a plurality of kinds of variables, which are acquired at past operation of the manufacturing process, in other words, temporally sequential data (hereinafter referred to as "variable data") of the kinds of variables, a plurality of kinds of variable data obtained at normal operation is stored in a state of being readable through the electrical communication line.

The storage unit 40 is achieved by a storage device such as a hard disk device and connected with the definition unit 50 and the control unit 60. The storage unit 40 stores sub models, properties, color display, and reliabilities as table values, and specifically stores a sub model table 41, a property table 42, a color display table 43, and a reliability table 44.

The definition unit 50 functions as a sub model definition unit 51, a property definition unit 52, and a color display definition unit 53 through execution of computer programs by an arithmetic processing device. The sub model definition unit 51 acquires a plurality of kinds of variable data obtained at normal operation from the operation DB 31 and produces, from the variable data, a plurality of sub models that predict the manufacturing state of the manufacturing process. Then, the sub model definition unit 51 stores data of the produced sub models in the sub model table 41.

Each sub model does not necessarily need to be produced by the sub model definition unit 51, but any available existing model may be stored in the sub model table 41 in advance without causing the sub model definition unit 51 to function. Specifically, the sub model may be any model that predicts the manufacturing state of the manufacturing process, such as a sub model newly produced by a regression expression or the like, or an existing sub model known from literature or the like.

The property definition unit 52 defines a property in the manufacturing process for a sub model, and stores data of the defined property in the property table 42. The color display definition unit 53 defines a color of display of a deviation index of the sub model, and stores data of the defined color in the color display table 43.

The control unit 60 is achieved by an arithmetic processing device such as a central processing unit (CPU), and controls the entire operation of the anomalous state diagnostic device 1. The control unit 60 functions as a deviation index calculation unit 61, a deviation index display unit 62, and a reliability calculation unit 63 through execution of computer programs by the arithmetic processing device. Functions of these units will be described later.

(Sub Model)

In the present invention, a sub model means an expression representing the relation among, for example, the state of a material before manufacturing, setting of the facility before manufacturing, the state of the facility during manufacturing, and the state of a product during manufacturing and/or after manufacturing. Various expression models that perform estimation mutually, such as an expression as a forward model that predicts the state of the product during manufacturing and/or after manufacturing from the state of the material before manufacturing, the setting state of the facility before manufacturing, the state of the facility during manufacturing, and the like, and an expression as an inverse model that inversely estimates whether the setting of the facility before manufacturing is appropriate from the state of the material before manufacturing, the state of the facility during manufacturing, the state of the product during manufacturing and/or after manufacturing, and the like are available as sub models. In addition, a model that estimates state amounts of a power generation facility and a conveyance facility included in the manufacturing process from various sensors and other state amounts and set values is available. Early sensing and factor estimation of an anomalous state are easier when a plurality of kinds of sub models are established in this manner than when one model is established in the entire manufacturing process.

In the manufacturing process, to produce a product with quality and a dimension as targeted, various models are established and the state of the manufacturing process and the state of the product during manufacturing are predicted, and thus such existing models may be used as sub models. When the number of sub models is insufficient, a new sub model can be added by statistical processing. For example, a regression expression may be obtained by using a plurality of variables other than the own variable that are acquired at normal operation of the manufacturing process, and may be used as a sub model. Each sub model is provided with a reliability (value that increase as prediction error decreases. The method of calculating the reliability will be described later) in accordance with prediction error of the sub model in a predetermined evaluation duration. When the calculated reliability is low, the configuration of the sub model is desirably readjusted but cannot be freely readjusted any time, and thus the low reliability needs to be used without readjustment for, for example, a certain duration in some cases.

(Deviation Index)

In the present invention, the deviation index means the difference value or ratio between a prediction value calculated from, for example, a sub model and the corresponding actual value of the manufacturing process, or means a value calculated based thereon. The deviation index is preferably a value calculated in combination with the reliability described above. The method of combination in this case is, for example, "deviation index with reliability taken into consideration"="deviation index without reliability taken into consideration [times] reliability". The deviation index is a value at a timing to be monitored, but the reliability is a value evaluated in a duration before the timing to be monitored, and thus their timings are different from each other.

(Property)

A property in the manufacturing process is defined for each sub model by the property definition unit 52 described above. As illustrated in, for example, FIG. 2, a property related to the actual value ("material before manufacturing" in the drawing) of the state (for example, temperature, thickness, or shape) of the material before processing in the manufacturing process, a property related to a set value ("facility setting" in the drawing) of the facility included in the manufacturing process, a property related to the actual value ("facility record" in the drawing) acquired from the facility included in the manufacturing process, a property related to the actual value ("manual intervention record" in the drawing) of the amount of operation by an operator at the facility included in the manufacturing process, a property related to the actual value ("intermediate product state record" in the drawing) of the state of an intermediate product during processing in the manufacturing process, and a property related to the actual value ("product after manufacturing" in the drawing) of the state of the product after processing in the manufacturing process are defined as first properties for each sub model in the present embodiment in advance. In the present embodiment, the six properties are defined as the first properties, but not all six properties necessarily need to be defined, and at least two or more properties among the six properties may be defined. However, properties are desirably defined as much as possible to perform more detailed factor estimation.

Facility classifications, specifically, classifications of N (N=1 to n) facilities sequentially arrayed from the upstream side to the downstream side in the manufacturing process are defined as second properties for each sub model. When the manufacturing process is an iron steel process including a plurality of rolling mills, a property related to an operation side of a rolling mill, a property related to a drive side of a rolling mill, and a property related to both operation and drive sides of a rolling mill are included as the second properties. The operation side of a rolling mill means a width-direction end part side of a rolling mill on which a motor configured to drive the rolling mill is not installed. The drive side of a rolling mill means a width-direction end part side of a rolling mill on which the motor configured to drive the rolling mill is installed.

[Anomalous State Diagnosis Method]

The anomalous state diagnosis method performed by the anomalous state diagnostic device 1 described above will be described below with reference to FIGS. 3 to 5. The anomalous state diagnosis method according to the present embodiment produces a plurality of sub models that predict the state of a process from the actual values of a plurality of kinds of variables obtained at normal operation, calculates the deviation index of the process from the normal state based on prediction error of each sub model, and diagnoses an anomalous state of the process based on the deviation index calculated for each sub model.

The anomalous state diagnosis method performs a reading step, a deviation index calculation step, and a deviation index display step as specifically illustrated in FIG. 3. The anomalous state diagnosis method also performs a sub-model production step, a reliability calculation step, and a corrected-deviation-index calculation step as necessary. In the following description, an example in which the anomalous state diagnosis method is applied to a manufacturing process such as an iron steel process will be described.

<Reading Step>

At the reading step, the deviation index calculation unit 61 reads, from the operation DB 31, a plurality of kinds of variable data acquired from the manufacturing process at a processing target time (step S1).

<Deviation Index Calculation Step>

Subsequently, at the deviation index calculation step, the deviation index calculation unit 61 calculates, by using the kinds of variable data read at the reading step, a value indicating how much the manufacturing state of the manufacturing process at the processing target time is different from the manufacturing state of the manufacturing process at normal operation, as the deviation index for each sub model (step S2).

Specifically, the deviation index calculation unit 61 first acquires data of each sub model from the sub model table 41, and calculates a prediction value at the processing target time for each variable by substituting the variable data read from the operation DB 31 into the corresponding sub model. Subsequently, the deviation index calculation unit 61 normalizes data of the actual values and prediction values of the kinds of variables to standardize the absolute amount and unit difference between variables. Subsequently, the deviation index calculation unit 61 calculates the difference value between the normalized prediction value and normalized actual value of each variable at the processing target time, as the deviation index of the manufacturing process from the normal state, for each sub model.

<Sub-Model Production Step>

In the present embodiment, the sub-model production step is performed before a timing at which the deviation index calculation step is performed. At the sub-model production step, the sub model definition unit 51 acquires a plurality of kinds of variable data obtained at normal operation from the operation DB 31 and produces, from the variable data, a plurality of sub models that predict the manufacturing state of the manufacturing process. Then, the sub model definition unit 51 stores the produced sub models in the sub model table 41. The sub-model production step does not necessarily need to be performed. When existing models are stored in the sub model table 41 in advance, the deviation index display step may be performed after the deviation index calculation step without performing the sub-model production step.

<Deviation Index Display Step>

Subsequently, at the deviation index display step, the deviation index display unit 62 displays temporal change of the deviation index for each sub model in different colors through the output unit 20 (step S3). Specifically, the sub models, the deviation index of which is displayed at the deviation index display step are sub models that are needed to diagnose any anomalous state of the manufacturing process and allow evaluation of the entire manufacturing process.

Figure 4:
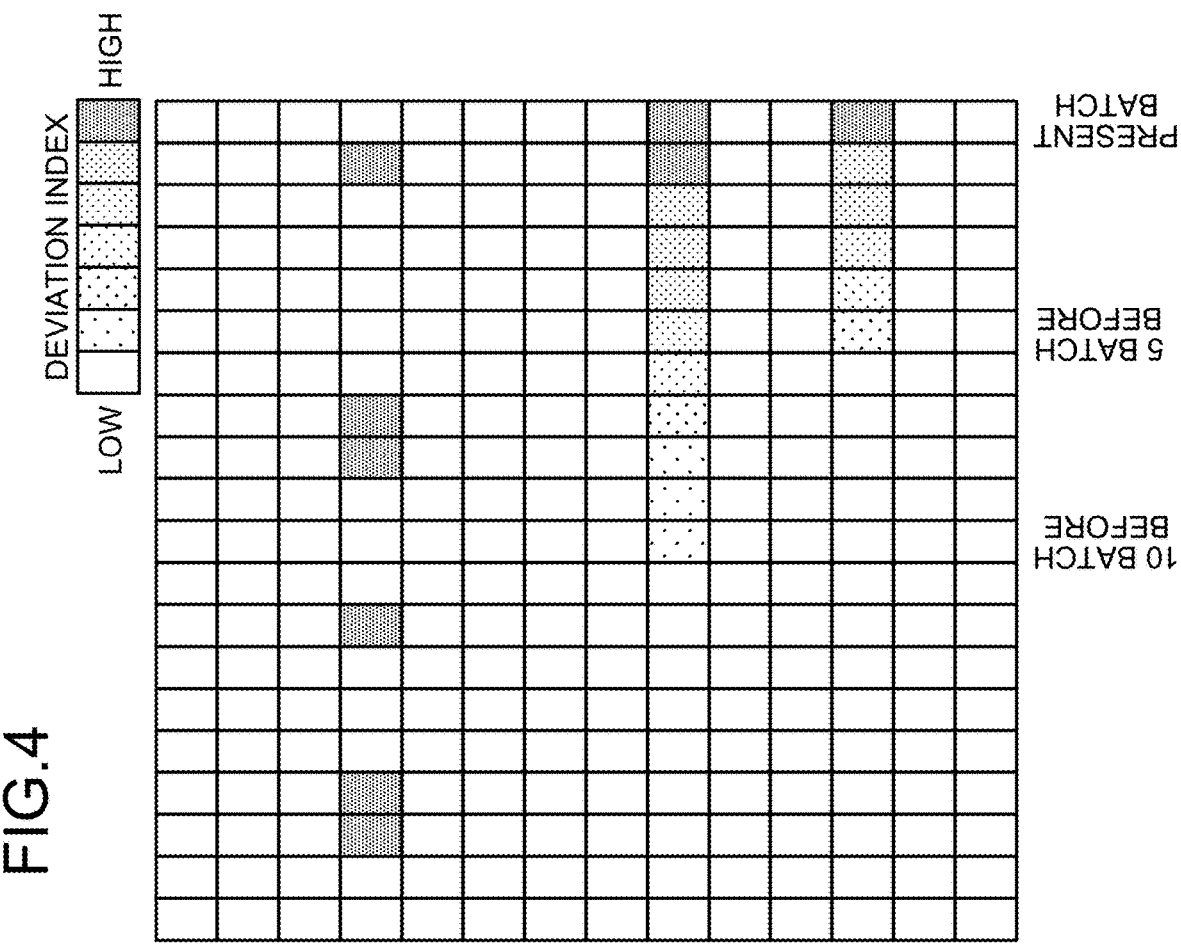
FIG. 4 is a conceptual diagram illustrating an example in which temporal change of a deviation index for each sub model is displayed in different colors in the process anomalous state diagnostic device according to the first embodiment of the present invention.

FIG. 4 is a conceptual diagram illustrating an example in which temporal change of the deviation index for each sub model is displayed by the deviation index display unit 62. In a table on the left side in the drawing, the first column indicates the number of the sub model, the second column indicates a facility classification property (refer to FIG. 2), the third column indicates a record classification property (refer to FIG. 2), and the fourth column indicates a basic amount classification property. Basic amount classification indicates classification based on a phenomenon in the manufacturing process, and indicates, for example, whether Variables A, B, and C are each, for example, a variable related to roll gap system, a variable related to tension system, or a variable related to roll speed system. A legend on the upper-right side in the drawing is defined by the color display definition unit 53, and the deviation index is lowest at the leftmost cell illustrated in white and is higher as dots are denser.

In FIG. 4, the vertical axis direction of a heat map on the right side is the deviation index of each sub model, and one cell indicates one sub model. The horizontal axis direction of the heat map is time transition, and one cell indicates one batch in the manufacturing process.

In the example illustrated in FIG. 4, the deviation index of Sub model M+2 and the deviation index of Sub model M+5 are continuously high from 10 batches and five batches before, respectively. In this manner, when the deviation index of a sub model is high over predetermined batches, the sub model can be thought to be a main factor of an anomalous state occurred in the manufacturing process. Thus, it is possible to easily specify, by referring to the heat map in the drawing, that Sub models M+2 and M+5 are main factors (true anomalies) of the anomalous state of the manufacturing process.

In the example illustrated in FIG. 4, the deviation index of Sub model 4 is high for a moment at 17, 16, 12, 8, 7, and 1 batches before, but is not continuously high over predetermined batches like Sub models M+2 and M+5 described above. It can be thought that such increase of the deviation index of a sub model for a moment is caused by noise attributable to the prediction accuracy of the sub model. Thus, it is possible to easily specify, by referring to the heat map in the drawing, that Sub model 4 is not a main factor of the anomalous state of the manufacturing process.

In this manner, at the deviation index display step, temporal change of the deviation index of a sub model is displayed in different colors in accordance with the magnitude of the deviation index for a long duration, and thus when the deviation index is increased, it is possible to easily understand whether the increase indicates a true anomaly or noise so that the true anomaly can be recognized early by, for example, an operator at a site.

Figure 5:
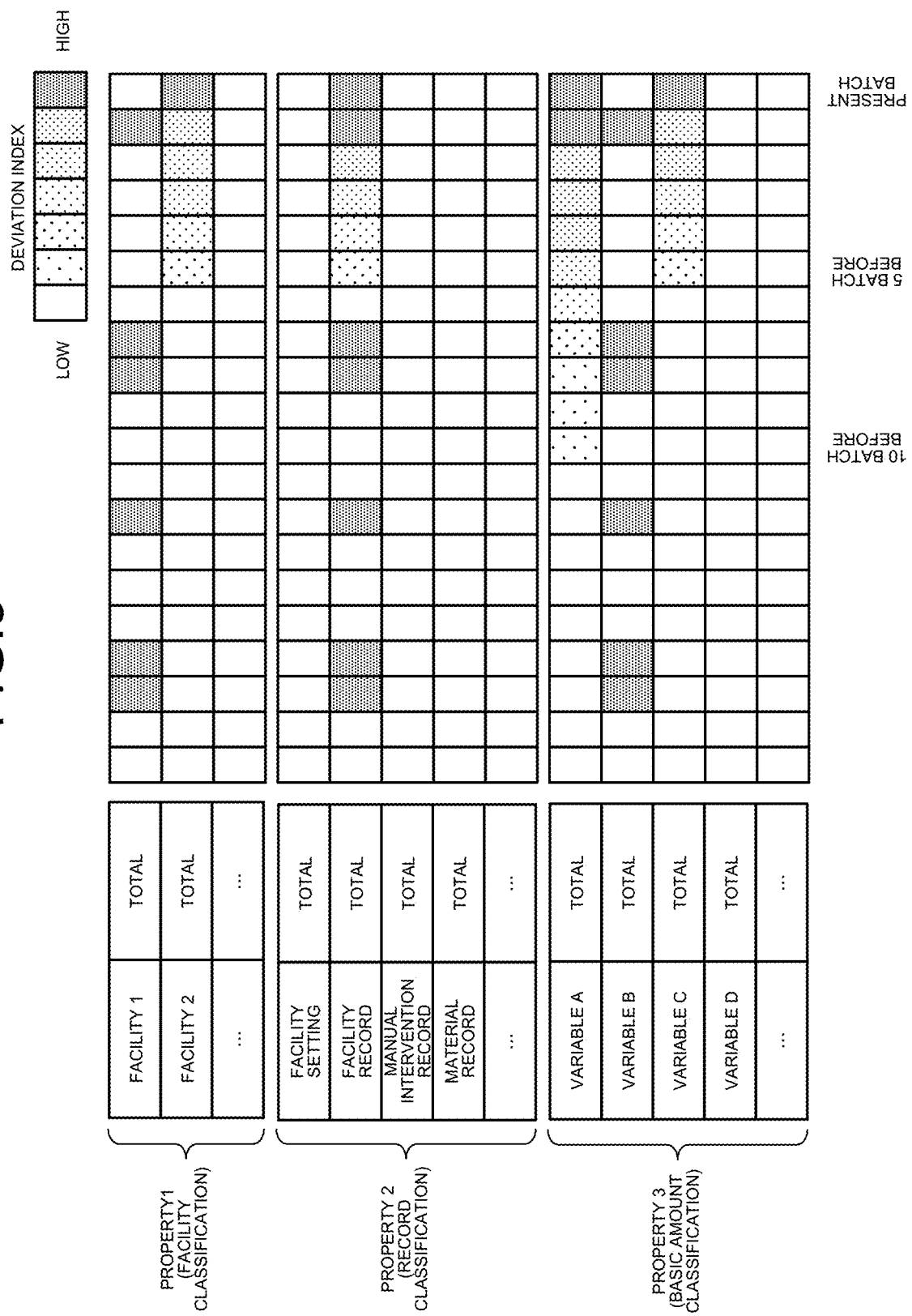
FIG. 5 is a conceptual diagram illustrating an example in which temporal change of the deviation index for each property is displayed in different colors in the process anomalous state diagnostic device according to the first embodiment of the present invention.

At the deviation index display step, the deviation indexes of sub models may be collectively displayed for each property as illustrated in, for example, FIG. 5. In this case, the property definition unit 52 defines a property for each sub model. Accordingly, at the deviation index display step, the deviation index display unit 62 collects deviation indexes for each property, and displays temporal change of the deviation indexes for the property in different colors in accordance with the magnitudes of the deviation indexes.

In FIG. 5, the deviation index of a sub model is divided into three properties, namely Property 1 (facility classification), Property 2 (record classification), and Property 3 (basic amount classification), and the sum of deviation indexes for each property is displayed in colors (white or dots) illustrated in a legend on the upper-right side in the drawing. For example, on the first row from the top in the drawing, the deviation indexes of sub models included in Facility 1 of Property 1 are summed for each batch and displayed in a color corresponding to the sum value.

In the example illustrated in FIG. 5, the deviation index of Facility 2 of Property 1, the deviation index of the facility record of the property 2, the deviation index of Variable A of Property 3, and the deviation index of Variable C of Property 3 are continuously high from five batches before, from five batches before, from 10 batches before, and from five batches before, respectively. Thus, it is possible to easily specify, by referring to the heat map in the drawing, that Facility 2, the facility record, Variables A and C are main factors of an anomalous state of the manufacturing process.

In FIG. 5, the sum of the deviation indexes of sub models defined with the same property is displayed in color, but for example, the average value or maximum value of the deviation indexes of sub models defined with the same property may be displayed in color.

In the anomalous state diagnosis method according to the present embodiment, the reliability calculation step may be performed before a timing at which the deviation index display step is performed.

<Reliability Calculation Step>

At the reliability calculation step, the reliability calculation unit 63 sets a predetermined evaluation duration and calculates the reliability based on prediction error of a sub model in the evaluation duration. Specifically, the reliability calculation unit 63 acquires variable data of the manufacturing process corresponding to the above-described evaluation duration from a process computer (not illustrated) through the input unit 10. Subsequently, the reliability calculation unit 63 calculates prediction error of the sub model in the above-described evaluation duration by using the acquired variable data, and calculates the reliability based on the prediction error. The reliability may be calculated as, for example, 1/(1+normalized prediction error). The normalized prediction error is obtained by normalizing the prediction error with the standard deviation of the prediction error over the evaluation duration. Then, the reliability calculation unit 63 stores data of the produced reliability in the reliability table 44.

The reliability calculated at the reliability calculation step is different from the reliability provided to the sub model in advance, and the evaluation duration and the variable data are different between calculations of the reliabilities. In other words, at the reliability calculation step, the reliability provided to each sub model in advance is calculated again with another evaluation duration.

Accordingly, at the deviation index display step, a sub model having a high reliability is selected, and temporal change of the deviation index of each selected sub model is displayed in different colors in accordance with the magnitude of the deviation index, similarly to FIG. 4 described above.

In the anomalous state diagnosis method according to the present embodiment, the corrected-deviation-index calculation step may be performed after the reliability calculation step.

<Corrected-Deviation-Index Calculation Step>

At the corrected-deviation-index calculation step, the deviation index calculation unit 61 calculates a corrected deviation index by weighting the deviation index of a sub model in accordance with the magnitude of the reliability calculated at the reliability calculation step. Accordingly, at the deviation index display step, the deviation index display unit 62 displays temporal change of the corrected deviation index of each sub model in different colors in accordance with the magnitude of the corrected deviation index similarly to FIG. 4 described above.

In the anomalous state diagnosis method according to the first embodiment as described above, temporal change of the deviation index of each sub model is displayed in different colors, and thus it is possible to easily understand whether an anomaly is a true anomaly. Accordingly, it is possible to find a minute anomaly early and prevent serious trouble.

EXAMPLE

Figure 6:
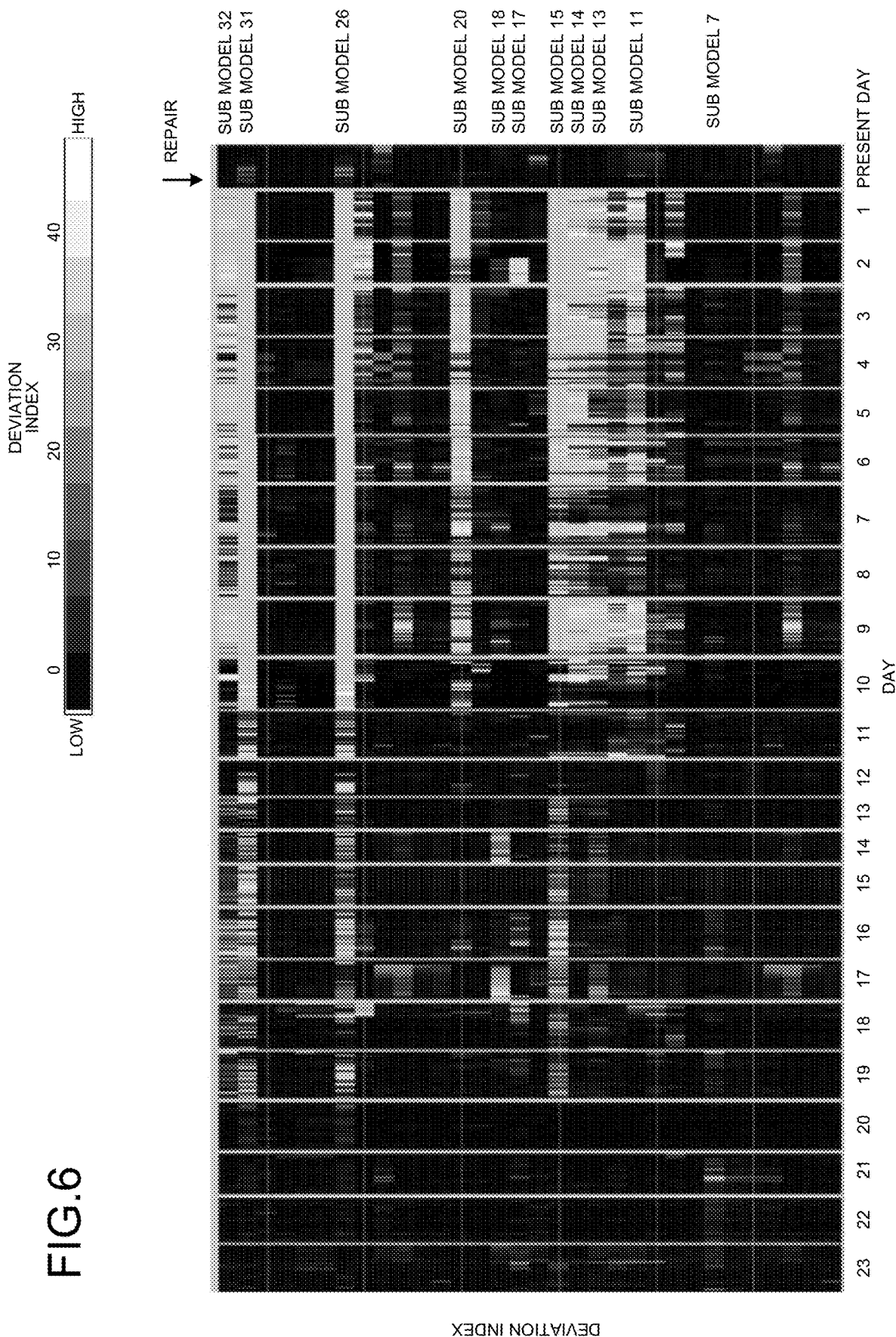
FIG. 6 is a diagram in which the deviation index acquired from actual operation for each sub model is displayed in different colors in an example of the first embodiment of the present invention.

The first embodiment of the present invention will be more specifically described below with reference to an example. FIG. 6 is an example in which the deviation index of each sub model acquired from actual operation is displayed in different colors according to the present invention.

The vertical axis direction in the drawing is the deviation index of each sub model. The horizontal axis direction in the drawing is time transition, and one cell indicates one batch for each day. Each number on the horizontal axis indicates the number of days before the current day.

As illustrated in FIG. 6, Sub models 11 to 15, 20 exhibit tendency that the deviation index is continuously high from about 10 days before. Sub Models 26, 31, and 32 exhibit tendency that the deviation index is continuously high from about 20 days before. Thus, it is possible to understand at a glance, by referring to the drawing, that these sub models are main factors of an anomalous state of the manufacturing process.

The deviation indexes of Sub models 7, 17, and 18 are partially high but not continuously high. Thus, it is understood that increase of the deviation indexes of these sub models is highly likely to be noise attributable to the prediction accuracy of the sub models.

In this manner, according to the present invention, it is possible to easily understand whether increase of the deviation index indicates noise or a true anomaly by displaying temporal change of the deviation index of each sub model in different colors for a long duration.

Second Embodiment

A process anomalous state diagnostic device and an anomalous state diagnosis method according to a second embodiment of the present invention will be described below with reference to FIGS. 7 to 12. In the present embodiment, functions as a platform for diagnosing an anomalous state of a process are clarified and concretized as compared to those in the first embodiment described above.

[Anomalous State Diagnostic Device]

Figure 7:
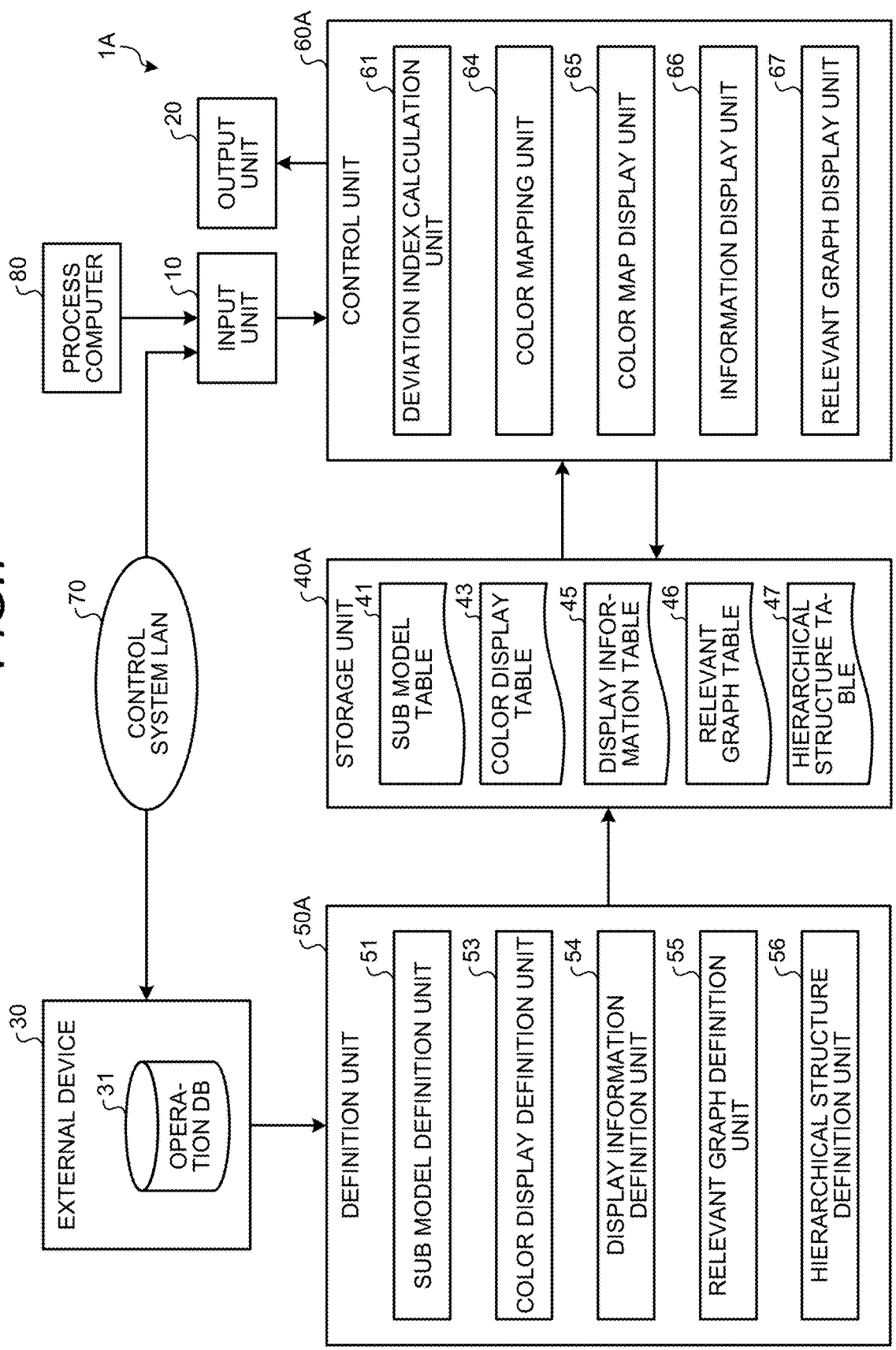
FIG. 7 is a block diagram illustrating the configuration of a process anomalous state diagnostic device according to a second embodiment of the present invention.

An anomalous state diagnostic device 1A is a device configured to diagnose an anomalous state of a process based on a plurality of deviation indexes for the magnitude of deviation from a reference that is the normal state of the process specified in advance, and as illustrated in FIG. 7, includes the input unit 10, the output unit 20, the external device 30, a storage unit 40A, a definition unit 50A, and a control unit 60A as main components. In the following description, an example in which the anomalous state diagnostic device 1A is applied to a manufacturing process such as an iron steel process will be described.

The input unit 10 is a device configured to receive actual operation data used for deviation index calculation through a control system LAN 70 as an information and control system network. As will be described later, the input unit 10 receives an operation condition of the manufacturing process, which is associated with the deviation index, from a process computer (procom) 80. The anomalous state diagnostic device 1A may include, as the input unit 10, for example, a mouse, a keyboard, or the like.

The output unit 20 is achieved by an output device such as a display device or a printing device, and outputs various kinds of processing information of the control unit 60A.

The external device 30 is connected with the definition unit 50A in a state in which information communication is possible through an electrical communication line. The external device 30 includes the operation DB 31. In the operation DB 31, actual values of a plurality of kinds of variables, which are acquired at past operation of the manufacturing process, in other words, variable data as temporally sequential data of the kinds of variables are stored in a state of being readable through the electrical communication line.

The storage unit 40A is achieved by a storage device such as a hard disk device and connected with the definition unit 50A and the control unit 60A. The storage unit 40A stores sub models, color display, display information, relevant graphs, and a hierarchical structure as table values, and specifically stores the sub model table 41, the color display table 43, a display information table 45, a relevant graph table 46, and a hierarchical structure table 47.

The definition unit 50A functions as the sub model definition unit 51, the color display definition unit 53, a display information definition unit 54, a relevant graph definition unit 55, and a hierarchical structure definition unit 56 through execution of computer programs by an arithmetic processing device. The sub model definition unit 51 acquires a plurality of kinds of variable data obtained at normal operation from the operation DB 31 and produces, from the variable data, a plurality of sub models that predict the manufacturing state of the manufacturing process. Then, the sub model definition unit 51 stores data of the produced sub models in the sub model table 41.

Each sub model does not necessarily need to be produced by the sub model definition unit 51. Any available existing model may be stored in the sub model table 41 in advance without causing the sub model definition unit 51 to function. Specifically, the sub model may be any model that predicts the manufacturing state of the manufacturing process, such as a sub model newly produced by a regression expression or the like, or an existing sub model known from literature or the like.

The color display definition unit 53 defines a color in accordance with the magnitude of the deviation index associated with each cell of a matrix to be described later, and stores data of the defined color in the color display table 43. The deviation index associated with each cell is normalized for all items based on, for example, by how much σ deviation there is from normal operation, and can be defined in a unified manner with, for example, "red for 6σ or larger", "orange for 4σ or larger", "yellow for 2σ or larger", and "blue for 2σ or smaller".

The display information definition unit 54 defines, as display information, a process condition associated with each cell on which color mapping is performed by a color mapping unit 64 to be described later, and stores the defined display information in the display information table 45. Examples of the process condition in a case of a manufacturing process include operation conditions such as a manufacturing number, operation start date and time, operation end date and time, and representative manufacturing specifications (for example, standards and sizes).

The relevant graph definition unit 55 produces, for the deviation index associated with each cell of a matrix to be described later, a relevant graph illustrating its relation with a variable item specified in advance, and stores the produced relevant graph in the relevant graph table 46. The relevant graph supports analysis of diagnosis of an anomalous state of the process, and is, for example, a temporal sequence chart of the deviation index, or a scatter diagram of a plurality of variables.

At the relevant graph production, the relevant graph definition unit 55 may plot the relevant graph in different colors and shapes for understanding of, for example, the relation between data of a normal interval specified in advance and a specified cell. As described later, when the deviation index is calculated based on a prediction model (sub model), the relevant graph definition unit 55 may produce scatter diagrams illustrating the relation between the deviation index and an explanatory variable of the prediction model and the relation between the actual value corresponding to the deviation index and the explanatory variable of the prediction model (refer to, for example, FIG. 12 to be described later).

The hierarchical structure definition unit 56 defines a hierarchical structure for each of a target item and a target time display interval, and stores the defined hierarchical structure in the hierarchical structure table 47. For example, as for the item, it is thought that, for example, the lowermost layer is an instrument, the upper layer thereon is a facility including a plurality of instruments, and the upper layer thereon is a process including a plurality of facilities. Alternatively, collection for each state variable (characteristic value of a manufacturing target, such as temperature) targeted for a state from the upstream side to the downstream side in the process can be considered. As for the time display interval, it is thought that, for example, the lowermost layer is a sampling time, the upper layer thereon is collection for each time, and the upper layer thereon is collection for each day. Alternatively, when the process is batch processing, collection for each batch processing can be considered.

The control unit 60A is achieved by an arithmetic processing device such as a CPU, and controls the entire operation of the anomalous state diagnostic device 1A. The control unit 60A performs various kinds of processing on an operation record and an operation condition input to the input unit 10 based on a set value, a prediction model (sub model), and the like stored in various tables in the storage unit 40A. The control unit 60A functions as the deviation index calculation unit 61, the color mapping unit 64, a color map display unit 65, an information display unit 66, and a relevant graph display unit 67 through execution of computer programs by an arithmetic processing device.

The deviation index calculation unit 61 selects a plurality of variables indicating the state of the process, and calculates the deviation index based on the difference between a prediction value by a prediction model that predicts the actual value of each selected variable and the actual value. Specifically, the deviation index calculation unit 61 calculates the deviation index for the operation record input to the input unit 10 based on a sub model stored in the sub model table 41. When the sub model is a prediction model such as a regression expression, the deviation index calculation unit 61 calculates the prediction value based on a regression coefficient, subsequently calculates an error from the actual value, and calculates the deviation index as a relative value to a collective value of a normal interval specified by a table in advance.

The deviation index in the present embodiment is not limited to that calculated by the deviation index calculation unit 61 but may be one that functions as the deviation index, for example, a physical quantity including a vibration value or a temperature value of a facility included in the process and indicating soundness of the facility. When such a value detected by a sensor or the like is directly used as the deviation index, the processing of calculating the deviation index by the deviation index calculation unit 61 is unnecessary, and thus it is possible to perform faster diagnosis of an anomalous state of the process.

The color mapping unit 64 performs structuring of a hierarchical two-dimensional matrix to fast perform color map display, information display, and relevant graph display to be described later. The color mapping unit 64 configures a two-dimensional matrix that has a first axis as the axis of a temporal factor including time and that has a second axis as the axis of an item of the deviation index. Then, the color mapping unit 64 associates each cell of the matrix with data for an item of the deviation index and a temporal factor, and allocates a color in accordance with the magnitude of the deviation index to each cell of the matrix based on the color display table 43.

In addition, the color mapping unit 64 collects cells of the matrix for each predetermined interval on the first axis or each item of the deviation index on the second axis based on the hierarchical structure table 47 to configure a matrix having a hierarchical structure including a plurality of layers. Then, the color mapping unit 64 associates each cell of the matrix at the layers with a collective value of collected deviation indexes, and allocates a color in accordance with the magnitude of the collective value of the deviation indexes to each cell of the matrix based on the color display table 43.

When collecting cells of the matrix for each predetermined interval on the first axis, the color mapping unit 64 may perform the collection for each batch processing in the process. The color mapping unit 64 may further collect, for each predetermined interval, two-dimensional data collected for each predetermined interval, thereby producing a multi-layer structure. The production of an interval multi-layer structure (hierarchization) can be performed by, for example, a method that performs collection at stages from the original measurement interval (msec order) to, for example, the interval of one second approximately, an interval in the unit of hours, an interval in the unit of days, or an interval in the units of batch processing when batch processing is included.

When collecting cells of the matrix for each item of the deviation index on the second axis, the color mapping unit 64 may perform the collection for each property of the deviation index. In addition, the color mapping unit 64 may produce a multi-layer structure by further collecting two-dimensional data collected for each property.

Figure 8:
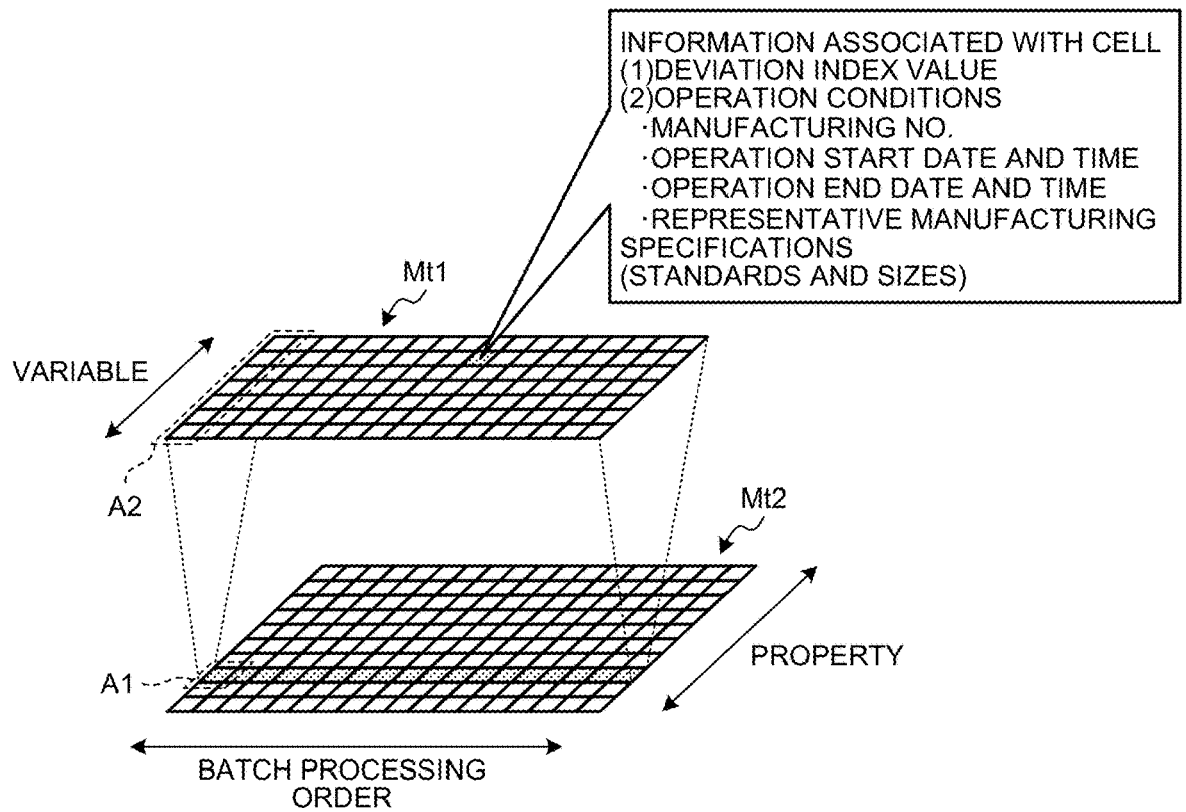
FIG. 8 is a diagram illustrating an exemplary two-dimensional matrix produced by a color mapping unit of the process anomalous state diagnostic device according to the second embodiment of the present invention.
Figure 9:
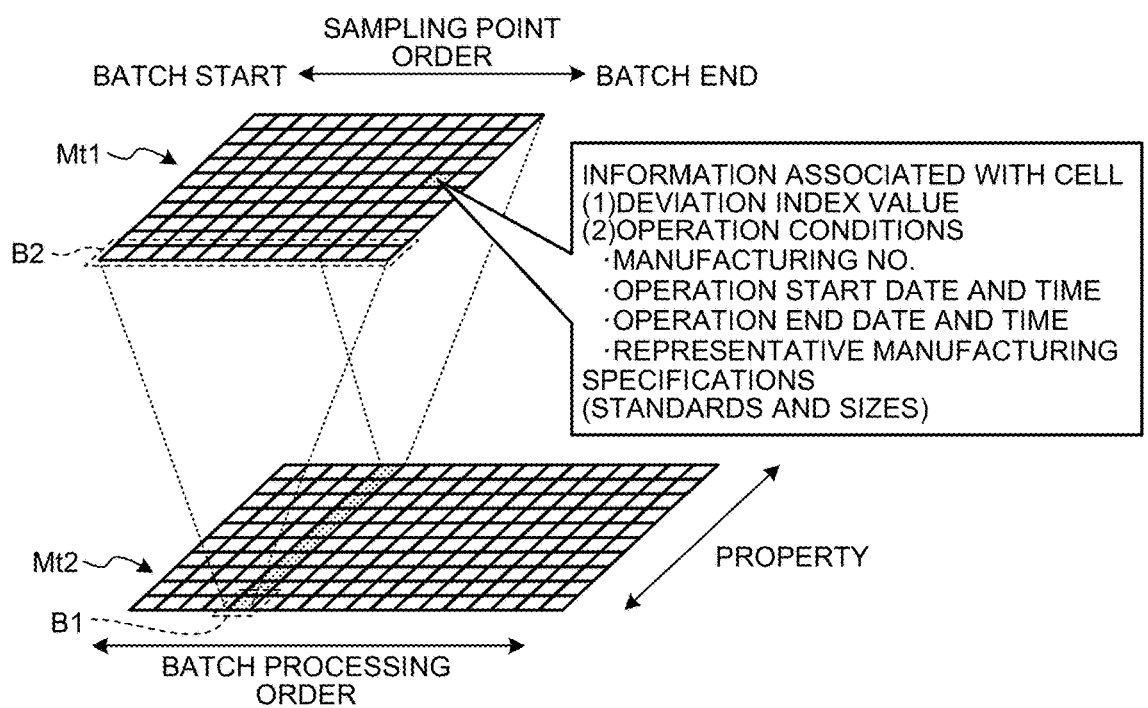
FIG. 9 is a diagram illustrating another exemplary two-dimensional matrix produced by the color mapping unit of the process anomalous state diagnostic device according to the second embodiment of the present invention.

The color mapping unit 64 configures a matrix having a hierarchical structure including a first matrix Mt1 and a second matrix Mt2 as illustrated in, for example, FIGS. 8 and 9. In application to an iron steel process, each cell of the first matrix Mt1 is associated with data of a plurality of rolled sheets in a rolling process, and each cell of the second matrix Mt2 is collectively associated with data of one rolled sheet. In FIGS. 8 and 9, for sake of simplicity, the first matrix Mt1 at the lowermost layer and the second matrix Mt2 at one layer higher are illustrated upside down. In the drawing, the matrix having two layers is illustrated as an example, but the number of layers of the matrix may be three or more as necessary.

In the first matrix Mt1 in FIG. 8, the vertical axis (second axis) is the item of the deviation index, and the horizontal axis (first axis) is the order of batch processing in the process. The "item of the deviation index" indicates the kind of a variable such as a roll gap or a rolling load, for example, in a case of an iron steel process. Each cell of the first matrix Mt1 in the drawing is associated with (1) the value of the deviation index and (2) an operation condition.

In the second matrix Mt2 in FIG. 8, the vertical axis (second axis) is the property of the deviation index, and the horizontal axis (first axis) is the order of batch processing in the process. The "property of the deviation index" is, for example, a sub process included in the process or a physical quantity indicating the state of the process. Each cell of the second matrix Mt2 in the drawing is associated with a collective value of the deviation indexes associated with a plurality of cells in the vertical axis direction in the first matrix Mt1.

The "sub process" is, for example, a block of a rolling facility made of a plurality of rolling mills, such as each rolling mill. The "physical quantity" is, for example, a rolling load of each rolling mill, a differential load and a total load of the rolling mills, current of each rolling mill motor, or material tension between the rolling mills.

For example, the average value or maximum value of the deviation indexes of a plurality of Cells A2 of the first matrix Mt1 at the lowermost layer in the vertical axis direction is allocated to Cell A1 of the second matrix Mt2 in FIG. 8. Similarly, operation conditions input from the input unit 10 are collected and allocated to each cell of the second matrix Mt2 in the drawing. For example, when the operation conditions are "manufacturing numbers", a manufacturing number at start of manufacturing at the corresponding cell, a manufacturing number at end of the manufacturing, and the like are allocated as a collective value.

In the first matrix Mt1 in FIG. 9, the vertical axis (second axis) is the property of the deviation index, and the horizontal axis (first axis) is the order of a sampling point in single batch processing in the process. Each cell of the first matrix Mt1 in the drawing is associated with (1) the value of the deviation index and (2) an operation condition.

In the second matrix Mt2 in FIG. 9, the vertical axis (second axis) is the property of the deviation index, and the horizontal axis (first axis) is the order of batch processing in the process. Each cell of the second matrix Mt2 in the drawing is associated with a collective value of the deviation indexes associated with a plurality of cells in the first matrix Mt1 in the horizontal axis direction.

For example, the average value or maximum value of the deviation indexes of a plurality of Cells B2 of the first matrix Mt1 at the lowermost layer in the horizontal axis direction is allocated to Cell B1 of the second matrix Mt2 in FIG. 9. Similarly, operation conditions input from the input unit 10 are collected and allocated to each cell of the second matrix Mt2 in the drawing.

The color map display unit 65 displays a color map produced by the color mapping unit 64. In addition, the color map display unit 65 displays a color map corresponding to the matrix at one layer lower, for example, when a pointer operation (first pointer operation or second pointer operation) is performed on a cell of the color map corresponding to a matrix at a layer on the screen of a display device (not illustrated) through movement of a pointing device (not illustrated). The color map display unit 65 may display a color map of a duration specified in advance and constantly display a color map of a latest constant interval on the screen of the above-described display device.

When the matrix having two layers as illustrated in, for example, FIGS. 8 and 9 is produced, the color mapping unit 64 described above produces a first color map in which a color in accordance with the magnitude of the deviation index is allocated to each cell of the first matrix Mt1, and a second color map in which a color in accordance with the magnitude of the collective value (average value or maximum value) of the deviation indexes is allocated to each cell of the second matrix Mt2. In this case, as illustrated in, for example, FIG. 10, the color map display unit 65 first displays a second color map Cm2, and displays a first color map Cm1 corresponding to a cell of the second color map Cm2 when a pointer operation is performed on the cell.

When a pointer is located on a specified cell through movement of the pointing device (not illustrated) and a specified pointer operation (third pointer operation) is performed, the information display unit 66 displays information such as an operation condition and the value of the deviation index, which is specified in the display information table 45.

Figure 10:
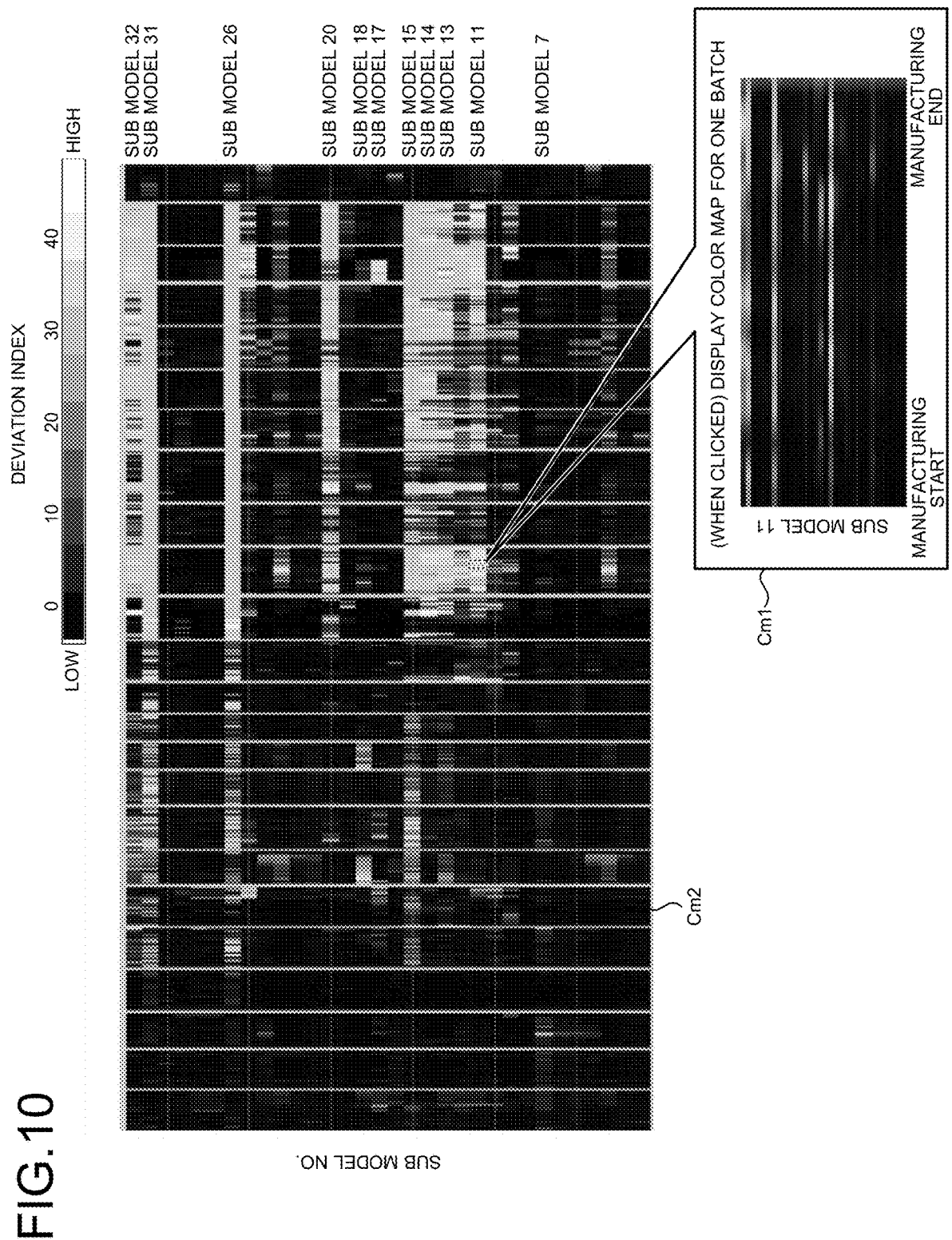
FIG. 10 is a diagram illustrating an example in which a color map corresponding to a cell is displayed in a separate window by a color map display unit of the process anomalous state diagnostic device according to the second embodiment of the present invention.

Specifically, the information display unit 66 associates each cell of the matrix configured by the color mapping unit 64 with a condition of the corresponding process (for example, a condition of the manufacturing the process), and displays (pop-up display), in a separate window, the value of the deviation index and the condition of the process that correspond to a cell, as illustrated in FIG. 10, when a pointer operation is performed on the cell. The "condition of the process" is, for example, a manufacturing standard or a command value in a case of the manufacturing the process.

When the pointer is located on a specified cell through movement of the pointing device (not illustrated) and a specified pointer operation (fourth pointer operation) is performed, the relevant graph display unit 67 displays a relevant graph defined by the relevant graph table 46.

Figure 11:
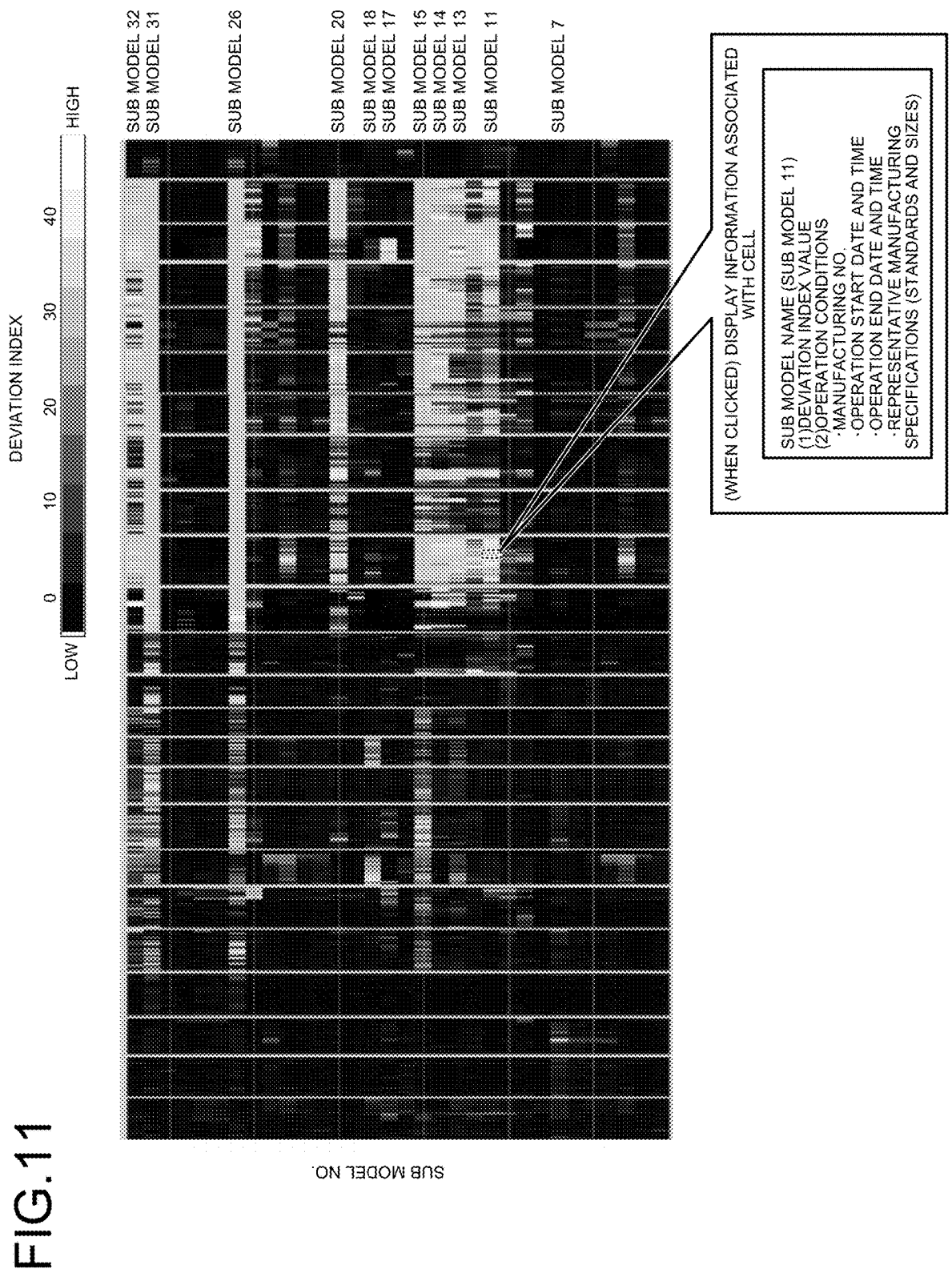
FIG. 11 is a diagram illustrating an example in which the value of the deviation index and process conditions corresponding to a cell are displayed in a separate window by an information display unit of the process anomalous state diagnostic device according to the second embodiment of the present invention.

Specifically, the relevant graph display unit 67 associates each cell of the matrix configured by the color mapping unit 64 with a temporal sequence chart of the corresponding deviation index or a scatter diagram of a plurality of variables specified for each deviation index as illustrated in FIG. 11, and displays (pop-up display), in a separate window, the temporal sequence chart or scatter diagram corresponding to a cell when a pointer operation is performed on the cell.

The scatter diagram illustrated in FIG. 12 assumes a case in which, for example, a sub model that predicts Variable A is available and the deviation index is calculated based on the sub model, and Variable A indicates itself and Variable B and Variable C indicate explanatory variables. In three scatter diagrams illustrated in the upper part of the drawing, the vertical axis is the value of the deviation index, and the horizontal axis is the actual value (raw value) of each variable. In each scatter diagram in the upper part, a part surrounded by a dashed line frame indicates the value of the deviation index whereas the other part indicates the actual value of each variable, and distribution of the deviation index and the raw value of the actual value is visually indicated.

In two scatter diagrams illustrated in the lower part of FIG. 12, the vertical axis and the horizontal axis are the actual value of each variable. In each scatter diagram in the lower part, a part surrounded by a dashed line frame indicates the actual value of the variable on the vertical axis whereas the other part indicates the actual value of the variable on the horizontal axis, and distribution of the raw value of the actual value is visually indicated.

Operations different from each other are allocated to the first to fourth pointer operations at the color map display unit 65, the information display unit 66, and the relevant graph display unit 67. Specific aspects of the pointer operations and display at the color map display unit 65, the information display unit 66, and the relevant graph display unit 67 are, for example, (1) to (3) as follows.

(1) When the pointer stops at a cell in the color map, a separate window is displayed, and items (enlargement of the first axis (horizontal axis), enlargement of the second axis (vertical axis), a process condition, a temporal sequence chart, a scatter diagram or another graph) that can be displayed in the window are displayed. Then, selected information or graph is displayed by clicking any of the items.

(2) When the pointer is moved to any cell on the color map and right click is performed, display items (enlargement of the first axis (horizontal axis), enlargement of the second axis (vertical axis), a process condition, a temporal sequence chart, a scatter diagram or another graph) are displayed in a pull-down menu. Then, selected information or graph is displayed by clicking any of the items.

(3) Display methods such as switching of display items in accordance with the way of clicking (for example, the number of clicks) or switching of display items in accordance with combination with a "Fn" key or another key on a keyboard are allocated so that each display item can be distinguished.

With the anomalous state diagnostic device 1A and the anomalous state diagnosis method according to the second embodiment as described above, a sign of generation of anomaly can be indicated to the operator in an easily visually recognizable manner by displaying the state of a process in a compressed color map, and strong impression can be provided to warn the operator when there is a sign of generation of anomaly. In addition, when deviation from the normal state is recognized based on the deviation index, temporally sequential data, an operation condition, relevant statistical data, and a relevant graph such as a scatter diagram can be displayed as appropriate in a detailed manner through a simple operation, and thus for example, a facility or a measurement signal as an anomaly factor can be specified early.

With the anomalous state diagnostic device 1A and the anomalous state diagnosis method according to the second embodiment, the deviation index has a hierarchical data structure, and thus for example, first, the entire data is overviewed with reference to a color map corresponding to the matrix at an upper layer (for example, a color map corresponding to the second matrix Mt2), and when an anomaly sign is observed, the corresponding cell is selected (clicked) to refer to a color map corresponding to the matrix at the lowermost layer (for example, a color map corresponding to the first matrix Mt1) and refer to more detailed data, thereby pursuing an anomaly factor.

The process anomalous state diagnostic devices and the anomalous state diagnosis methods according to the present invention are more specifically described above with reference to embodiments and examples, but the scope of the present invention is not limited to the description and should be widely interpreted based on description of the claims. Various kinds of changes and modifications based on the description are included in the scope of the present invention.

For example, the anomalous state diagnostic device 1 according to the first embodiment of the present invention may perform the anomalous state diagnosis method by using a sub model, a property, and color display produced in advance and stored in a table of each DB of the storage unit 40. In this case, the anomalous state diagnostic device 1 may not include the sub model definition unit 51, the property definition unit 52, and the color display definition unit 53 illustrated in FIG. 1.

The first and second embodiments of the present invention describe the example in which the anomalous state diagnostic device 1 and the anomalous state diagnosis method are applied to a manufacturing process such as an iron steel process, but the anomalous state diagnostic device 1 and the anomalous state diagnosis method are also applicable to a power generation process, a conveyance process, and the like.

Similarly to the first embodiment, the anomalous state diagnostic device 1A according to the second embodiment of the present invention may calculate the deviation index with the reliability taken into consideration. In this case, a reliability calculation unit configured to set a predetermined evaluation duration and calculate the reliability based on prediction error of a sub model in the evaluation duration is added to the anomalous state diagnostic device 1A, and the deviation index calculation unit 61 calculates a corrected deviation index by weighting the deviation index of the sub model in accordance with the magnitude of the reliability calculated by the reliability calculation unit.

The present specification also discloses the following inventions (1) to (5) corresponding to the first embodiment described above.

(1) A process anomalous state diagnostic device configured to use a sub model that predicts a manufacturing state of a process from actual values of a plurality of kinds of variables obtained at normal operation, calculate a deviation index of the process from the normal state based on prediction error of the sub model, and diagnose an anomalous state of the process based on the deviation index calculated for each sub model, the process anomalous state diagnostic device including a deviation index display unit configured to display temporal change of the deviation index of each sub model in different colors in accordance with the magnitude of the deviation index.

(2) In the above-described invention, the process anomalous state diagnostic device further includes a reliability calculation unit configured to set an evaluation duration and calculate reliability based on the prediction error of the sub model in the evaluation duration, and the deviation index display unit selects the sub model for which the reliability is high, and displays temporal change of the deviation index of each selected sub model in different colors in accordance with the magnitude of the deviation index.

(3) In the above-described invention, the process anomalous state diagnostic device further includes a deviation index calculation unit configured to calculate a corrected deviation index by weighting the deviation index of the sub model in accordance with the magnitude of the reliability, and the deviation index display unit displays temporal change of the corrected deviation index of each sub model in different colors in accordance with the magnitude of the corrected deviation index.

(4) In the above-described invention, the process anomalous state diagnostic device further includes a property definition unit configured to define a property for each sub model, and the deviation index display unit collects the deviation indexes for each property and displays temporal change of the deviation indexes for each property in different colors in accordance with the magnitudes of the deviation indexes.

(5) A process anomalous state diagnosis method that uses a sub model that predicts a manufacturing state of a process from actual values of a plurality of kinds of variables obtained at normal operation, calculates a deviation index of the process from the normal state based on prediction error of the sub model, and diagnoses an anomalous state of the process based on the deviation index calculated for each sub model, the process anomalous state diagnosis method displaying temporal change of the deviation index of each sub model in different colors in accordance with the magnitude of the deviation index.

REFERENCE SIGNS LIST 1, 1A anomalous state diagnostic device
10 input unit
20 output unit
30 external device
31 operation database (operation DB)
40, 40A storage unit 41 sub model table
42 property table
43 color display table
44 reliability table
45 display information table
46 relevant graph table
47 hierarchical structure table
50, 50A definition unit
51 sub model definition unit
52 property definition unit
53 color display definition unit
54 display information definition unit
55 relevant graph definition unit
56 hierarchical structure definition unit
60, 60A control unit
61 deviation index calculation unit
62 deviation index display unit
63 reliability calculation unit
64 color mapping unit
65 color map display unit
66 information display unit
67 relevant graph display unit
70 control system LAN
80 process computer (procom)
Cm1 first color map
Cm2 second color map
Mt1 first matrix
Mt2 second matrix

The invention claimed is:

1. A process anomalous state diagnostic device configured to diagnose an anomalous state of a process based on deviation indexes for a magnitude of deviation from a reference that is a normal state of the process, the process anomalous state diagnostic device comprising:
 a color mapping unit configured to configure a two-dimensional matrix that has a first axis as an axis of a temporal factor including time and that has a second axis as an axis of an item of each deviation index, associate each cell of the matrix with data for an item of the deviation index and the temporal factor, and allocate a color in accordance with the magnitude of the deviation index to each cell of the matrix; and
 a color map display unit configured to display a color map produced by the color mapping unit.

2. The process anomalous state diagnostic device according to claim 1, further comprising a deviation index calculation unit configured to select variables indicating the state of the process and calculate the deviation index based on the difference between a prediction value by a prediction model that predicts an actual value of each selected variable and the actual value.

3. The process anomalous state diagnostic device according to claim 1, wherein the deviation index is a physical quantity including a vibration value or a temperature value of a facility included in the process and indicating soundness of the facility.

4. The process anomalous state diagnostic device according to claim 1, wherein the color mapping unit is configured to configure a matrix having a hierarchical structure including plurality of layers by collecting each cell of the matrix for each predetermined interval on the first axis, associate a collective value of collected deviation indexes to each cell on each layer of the matrix, and allocate a color in accordance with the magnitude of the collective value of the deviation indexes to each cell on each layer of the matrix, and
 the color map display unit is configured to display, when a first pointer operation is performed on a cell of a color map corresponding to the matrix at a certain layer, a color map corresponding to the matrix one layer lower than the certain layer.

5. The process anomalous state diagnostic device according to claim 2, wherein the color mapping unit is configured to configure a matrix having a hierarchical structure including plurality of layers by collecting each cell of the matrix for each predetermined interval on the first axis, associate a collective value of collected deviation indexes to each cell on each layer of the matrix, and allocate a color in accordance with the magnitude of the collective value of the deviation indexes to each cell on each layer of the matrix, and
 the color map display unit is configured to display, when a first pointer operation is performed on a cell of a color map corresponding to the matrix at a certain layer, a color map corresponding to the matrix one layer lower than the certain layer.

6. The process anomalous state diagnostic device according to claim 3, wherein the color mapping unit is configured to configure a matrix having a hierarchical structure including plurality of layers by collecting each cell of the matrix for each predetermined interval on the first axis, associate a collective value of collected deviation indexes to each cell on each layer of the matrix, and allocate a color in accordance with the magnitude of the collective value of the deviation indexes to each cell on each layer of the matrix, and
 the color map display unit is configured to display, when a first pointer operation is performed on a cell of a color map corresponding to the matrix at a certain layer, a color map corresponding to the matrix one layer lower than the certain layer.

7. The process anomalous state diagnostic device according to claim 4, wherein the color mapping unit is configured to collect each cell of the matrix for each batch processing in the process.

8. The process anomalous state diagnostic device according to claim 5, wherein the color mapping unit is configured to collect each cell of the matrix for each batch processing in the process.

9. The process anomalous state diagnostic device according to claim 6, wherein the color mapping unit is configured to collect each cell of the matrix for each batch processing in the process.

10. The process anomalous state diagnostic device according to claim 1, wherein the color mapping unit is configured to configure a matrix having a hierarchical structure including plurality of layers by collecting each cell of the matrix for each item of the deviation index on the second axis, associate a collective value of collected deviation indexes to each cell on each layer of the matrix, and allocate a color in accordance with the magnitude of the collective value of the deviation indexes to each cell on each layer of the matrix, and
 the color map display unit is configured to display, when a second pointer operation is performed on a cell of a color map corresponding to the matrix at a certain layer, a color map corresponding to the matrix one layer lower than the certain layer.

11. The process anomalous state diagnostic device according to claim 2, wherein the color mapping unit is configured to configure a matrix having a hierarchical structure including plurality of layers by collecting each cell of the matrix for each item of the deviation index on the second axis, associate a collective value of collected deviation indexes to each cell on each layer of the matrix, and allocate a color in accordance with the magnitude of the collective value of the deviation indexes to each cell on each layer of the matrix, and the color map display unit is configured to display, when a second pointer operation is performed on a cell of a color map corresponding to the matrix at a certain layer, a color map corresponding to the matrix one layer lower than the certain layer.

12. The process anomalous state diagnostic device according to claim 3, wherein the color mapping unit is configured to configure a matrix having a hierarchical structure including plurality of layers by collecting each cell of the matrix for each item of the deviation index on the second axis, associate a collective value of collected deviation indexes to each cell on each layer of the matrix, and allocate a color in accordance with the magnitude of the collective value of the deviation indexes to each cell on each layer of the matrix, and the color map display unit is configured to display, when a second pointer operation is performed on a cell of a color map corresponding to the matrix at a certain layer, a color map corresponding to the matrix one layer lower than the certain layer.

13. The process anomalous state diagnostic device according to claim 10, wherein the color mapping unit is configured to collect each cell of the matrix for each property of the deviation index.

14. The process anomalous state diagnostic device according to claim 11, wherein the color mapping unit is configured to collect each cell of the matrix for each property of the deviation index.

15. The process anomalous state diagnostic device according to claim 12, wherein the color mapping unit is configured to collect each cell of the matrix for each property of the deviation index.

16. The process anomalous state diagnostic device according to claim 13, wherein the property of the deviation index is a sub process included in the process or a physical quantity indicating the state of the process.

17. The process anomalous state diagnostic device according to claim 14, wherein the property of the deviation index is a sub process included in the process or a physical quantity indicating the state of the process.

18. The process anomalous state diagnostic device according to claim 15, wherein the property of the deviation index is a sub process included in the process or a physical quantity indicating the state of the process.

19. The process anomalous state diagnostic device according to claim 1, further comprising an information display unit configured to associate each cell of the matrix with a corresponding condition of the process and to display the value of the deviation index and the condition of the process corresponding to the cell in a separate window when a third pointer operation is performed on the cell.

20. The process anomalous state diagnostic device according to claim 1, further comprising a relevant graph display unit configured to associate each cell of the matrix with a temporal sequence chart of the corresponding deviation index or a scatter diagram of variables specified for each corresponding deviation index and to display the temporal sequence chart or the scatter diagram corresponding to the cell in a separate window when a fourth pointer operation is performed on the cell.

21. The process anomalous state diagnostic device according to claim 19, further comprising a relevant graph display unit configured to associate each cell of the matrix with a temporal sequence chart of the corresponding deviation index or a scatter diagram of variables specified for each corresponding deviation index and to display the temporal sequence chart or the scatter diagram corresponding to the cell in a separate window when a fourth pointer operation is performed on the cell.

22. An anomalous state diagnosis method for a process of diagnosing an anomalous state of a process based on deviation indexes for a magnitude of deviation from a reference that is a normal state of the process, the anomalous state diagnosis method comprising:

a color mapping step of configuring a two-dimensional matrix that has a first axis as an axis of a temporal factor including time and that has a second axis as an axis of an item of each deviation index, associating each cell of the matrix with data for an item of the deviation index and the temporal factor, and allocating a color in accordance with the magnitude of the deviation index to each cell of the matrix; and a color map display step of displaying a color map produced at the color mapping step.

* * * * *